UNITED STATES PATENT OFFICE.

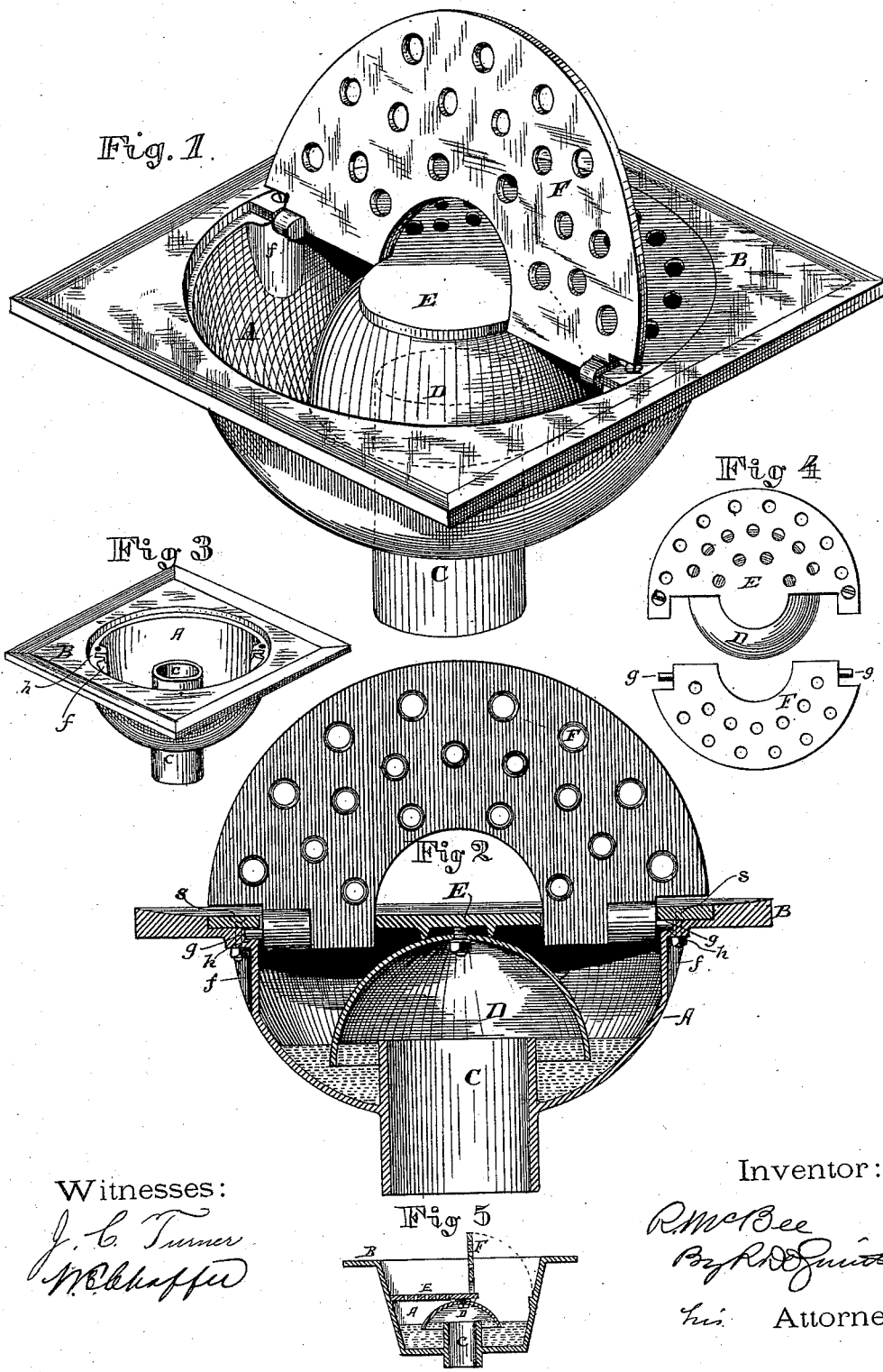

RANDOLPH McBEE, OF WASHINGTON, DISTRICT OF COLUMBIA.

STENCH-TRAP.

SPECIFICATION forming part of Letters Patent No. 286,951, dated October 16, 1883.

Application filed May 21, 1883. (No model.)

*To all whom it may concern:*

Be it known that I, RANDOLPH MCBEE, of Washington, in the District of Columbia, have invented a new and useful Improvement in Stench-Traps; and I do hereby declare that the following is a full and accurate description of the same.

This invention relates to that class of traps commonly called "bell-traps," consisting, essentially, of a cup or receptacle capable of retaining a body of water, and, dipping into the same and surrounding the outlet from said cup, an inverted cup or bell, which cuts off communication between said outlet and the space surrounding said bell, except by passage through the contained water. The receptacle is commonly covered with a grated or reticulated cover. These traps are commonly used under hydrants and in other situations about habitations where it is necessary or desirable to provide an escape for surface-drainage. They are also used in many other places in connection with domestic drainage, which it is not necessary to particularly specify. The grated covering is required to prevent the passage into the trap of solid matters too large to pass the trap; but experience has shown that the trap will soon become choked with mud and solid sedimentary matter deposited from the water, which must be always present to maintain the water-seal. If this sediment is not removed, the trap will cease to perform its office, and to effect this removal it is necessary to remove the grated cover; but it is also necessary that the bell or trap shall not be removed, because then the opening to the sewer will be uncovered, and the gases will be allowed free escape at the same time that matters may pass into the sewer to clog the same at a point below the trap.

As commonly made, the bell is attached to the cover and the latter is unfastened, so that it is easily removed, and, as a matter of fact, frequently is removed, mislaid, broken, or lost.

I am aware that the bell has been supported from below independent of the cover; but that method necessarily places one or more obstructions to the free passage of fluid and solid matters down to and beneath the bell and to the sewer.

The object of my invention is, therefore, to remedy all these causes of annoyance and dangers, not only from the free escape of sewer-gas, but from the passage of large objects into the drain-pipe, by supporting the bell permanently in place from above, and by rendering a part of the grated cover easily removable, but undetachable, so as to avoid possible misplacement and loss.

I am aware that perforated covers for drain-pipe inlets have sometimes been hinged; but I am not aware that any trap has heretofore been made under the conditions referred to in the last preceding paragraph.

I will now particularly point out and describe the manner in which I prefer to construct my device, without, however, designing to confine myself to the details exactly as shown.

Figure 1 is a perspective view of my device. Fig. 2 is a vertical transverse section of the same. Figs. 3 and 4 show the parts detached. Fig. 5 shows the same applied to a deep or box trap, such as are used under hydrants, &c.

A is the cup or receptacle into which the drain-water is discharged from the surrounding surface. The drain-pipe C projects upward into said cup a sufficient distance to be covered and inclosed within the inverted cup or bell D, the edge of which passes below the upper end of the drain-pipe C as far as is deemed necessary to produce an adequate seal. When in use, water stands in the cup A to the level of the upper end of the drain-pipe C, and the lower edge of the bell D dips below the surface of this water, as shown. The depth to which the bell D penetrates the water is the depth of the seal. The space surrounding the upward projection of the pipe C within the cup A is the receptacle for sediment, and said space will, after a time, become filled with this sediment up to the edge of the bell D, and the trap will then be choked and useless until the sediment has been removed. The bell D is attached to a bridge-plate, E, or otherwise permanently supported in its place from above. I prefer to attach it to the bridge-plate by the central screw or by casting integral therewith, and said bridge-plate is secured to the edges of the cup A by means of screws $s$, which pass down into niches $f$, made in the outer surface of the cup A, as shown. There are of course a variety of ways in which this fastening may be accomplished; but I have sought to find the way which will be, all things considered, the easiest and cheapest way. The bridge-plate E may be expanded at one edge, so as to constitute one-half the grated cover, as shown in Fig. 1, or it may serve only as a bridge-piece, there being two hinged in the cover. This, however, is merely a modification. The hinged cover-plate F is provided with pintles $g$, adapted to project into bearing-sockets $h$ in the metal constituting the sides of the niches $f$, and they are covered and secured in place by overlapping parts of the bridge-plate E and the fastening-screws $s$. This method affords a permanent and secure support for the bell D from above, so that its dipping edges are unobstructed, while the vestibule of the trap is rendered easily accessible for the removal of sediment without the possible displacement or loss of any part or the uncovering of the sewer or drain pipe. It also renders the device easy to make and put together.

In the drawings, B represents the marginal flange or surface, whereby fluids are conducted to the grated cover and to the trap.

Having described my invention, what I claim as new is—

1. A bell-trap comprising a cup, A, drain-pipe C, and inverted cup or bell D, rigidly supported in place from above by the bridge-plate E, whereby the chamber around the bell and the edges of said bell are left clear and unobstructed, combined with a hinged grated cover which may be opened and closed independently of and without disturbing said bell, as set forth.

2. A cup, A, provided with the drain-pipe C, united thereto, the niches $f$, sockets $h$, and holes for the bolts $s$, combined with an inverted cup or bell, D, permanently held in place over the drain-pipe C, and the hinged cover F, provided with pintles $g$, adapted to the sockets $h$, and the bridge-plate E, secured by bolts $s$, substantially as and for the purpose set forth.

3. The cup A, provided with the flange B, niches $f$, sockets $h$, and holes for bolts $s$, combined with the cover F, provided with pintles $g$, and the bridge-plate E, with the bell D attached thereto, substantially as set forth.

RANDOLPH McBEE.

Witnesses:
JAMES STOTT,
R. D. O. SMITH.